United States Patent Office 3,423,398
Patented Jan. 21, 1969

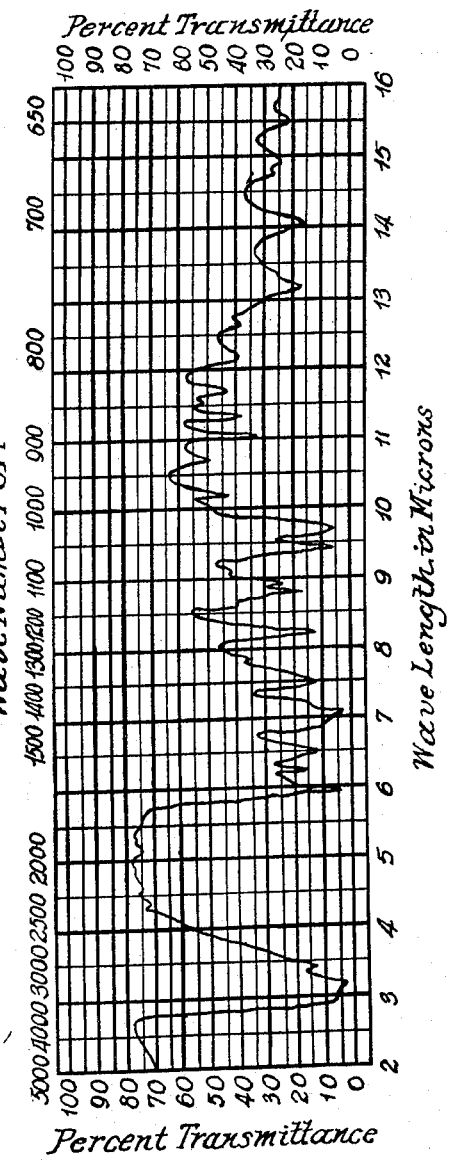
Fig. 1. Infrared Absorption Spectrum of BA-90912 Crystallized from Aqueous Acetic Acid

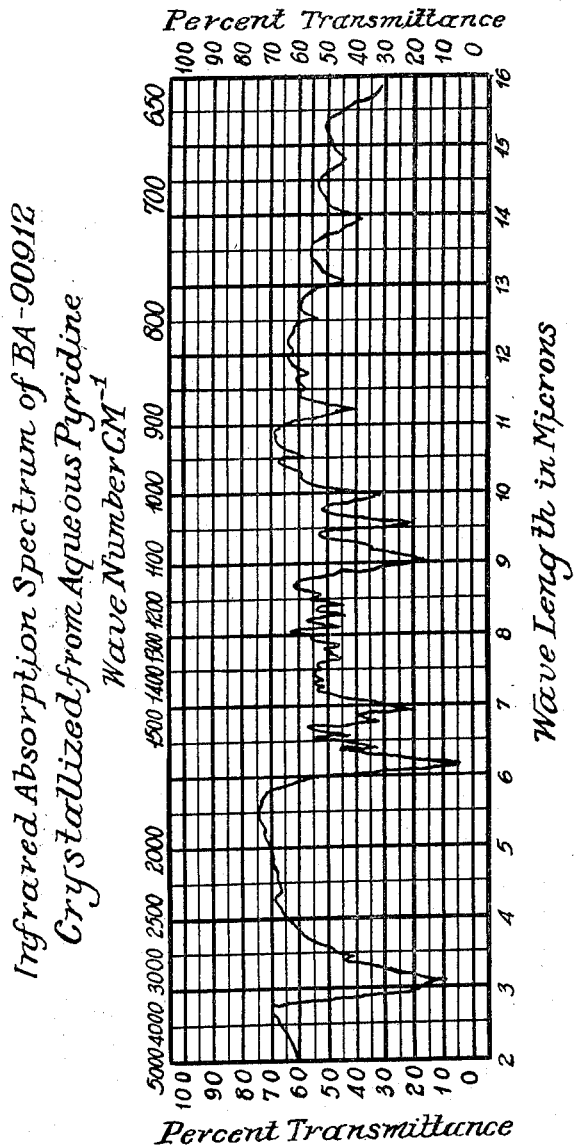

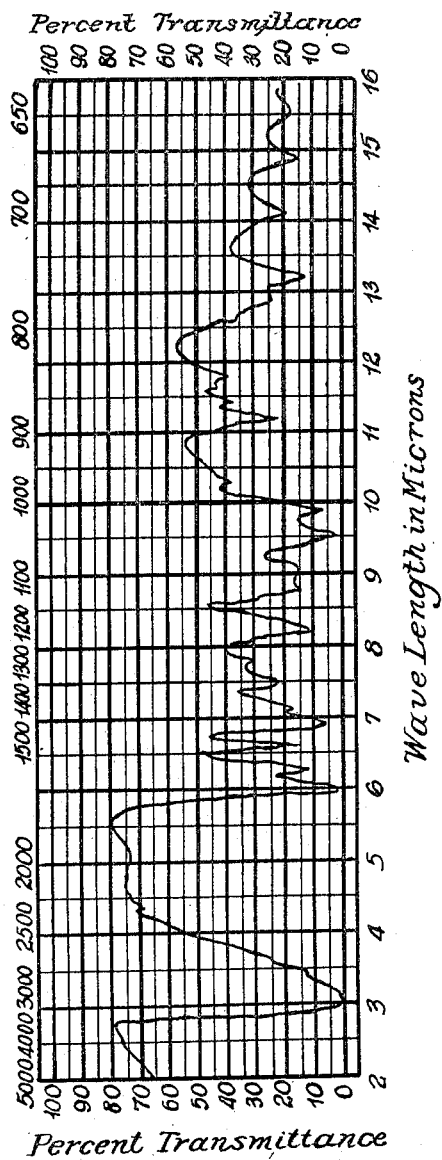

3,423,398
SANGIVAMYCIN AND DERIVATIVES THEREOF
Koppaka V. Rao, Pine Brook, William S. Marsh, Wanaque, and Donald W. Renn, River Vale, N.J., assignors to Chas. Pfizer & Co., Inc., New York, N.Y., a corporation of Delaware
Continuation-in-part of application Ser. No. 228,695, Oct. 5, 1962. This application May 10, 1965, Ser. No. 454,637
U.S. Cl. 260—211.5                7 Claims
Int. Cl. A61k 27/00; C12k 1/00

This application is a continuation-in-part of our pending application Serial No. 228,695, filed October 5, 1962 and now abandoned.

This invention relates to a novel substance useful for inhibiting the growth of tumors, and to processes for its production and purification. More particularly, it relates to the cultivation under controlled conditions of a new strain of Streptomyces rimosus, to the biologically active substance produced thereby, to methods for the recovery and concentration from crude solutions, including fermentation broths, and to the pharmaceutically acceptable acid addition salts and other derivatives of this new and useful substance. The novel substance of the present invention and its derivatives are useful in the treatment of malignant tumors in animals. In addition, it is also useful for medical research purposes, and in preventing yeast contamination in industrial fermentations and as an intermediate for the production of toyocamycin, a known antibiotic active against Candida albicans and Mycobacterium tuberculosis.

It has been discovered that the biologically active substance produced by the strain of Streptomyces rimosus of the present invention and the pharmaceutically acceptable acid addition salts of said substance possess the power to inhibit experimental tumor development in laboratory animals at extremely low concentrations and is strongly cytotoxic towards HeLa cells grown in cell culture.

The organism which is employed in the valuable process of the present invention was obtained from a soil sample collected in Ghana, and isolated on an agar formulation of the following composition:

| | Grams/liter |
|---|---|
| Dextrose | 1.5 |
| Glycerol | 1.5 |
| Lactose | 1.5 |
| Peptone | 0.25 |
| Asparagine | 0.25 |
| NaNO$_3$ | 0.25 |
| Corn steep liquor | 0.25 |
| Beef extract | 0.25 |
| Distiller's solubles | 0.25 |
| Yeast extract | 0.25 |
| Wheat germ | 0.25 |
| Sea salt | 2.0 |
| Agar | 2.0 |

Tap water to volume.
Adjust to pH 7 before sterilization.

A sample of the culture has been deposited in the American Type Culture Collection in Washington, D.C., and assigned ATCC No. 14673. It is identified in the records of Chas. Pfizer & Co., Inc., as Isolate BA–90912. The isolated culture was identified by Dr. J. B. Routien as a member of the species Streptomyces rimosus and the cultural characteristics are shown in Table 1. These results were obtained after two weeks of growth at 28° C.

It is to be understood that for the production of the active substance according to the present invention, limitation to the aforesaid organism is not intended. It is especially desired and intended to include mutants produced from this organism by various means such as irradiation with X-rays or ultraviolet light, treatment with nitrogen mustards, and the like.

It is also intended to include any organism regardless of its appearance or physiological behavior, that may be developed by means of transformation, transduction, genetic recombination or some other genetical procedure using a nucleic acid from the herein described species, whereby it has acquired the ability to the produce the elaboration product here described or to carry on the biochemical change here described.

It is to be further understood that some prior art strains of Streptomyces rimosus are shown to produce the anti-tumor agent of the instant invention. However, the active material was not recognized until now having been discarded with the sewer liquors, and furthermore, the amounts produced by the prior art strains are found to be very low.

For preparation of the new substance, hereinafter referred to as sangivamycin, a wide variety of fermentation media are satisfactory. A medium composed basically of a source of assimilable nitrogen, a source of carbohydrate, and a source of minerals is required. Satisfactory nitrogen sources include hydrolyzed casein of various types, soy bean meal, distiller's solubles, corn meal, nitrates, ammonium salts, urea, and the like. Suitable carbohydrate sources include corn starch, dextrose, lactose, dextrin, etc. The preceding materials frequently contain sufficient minerals to satisfy the mineral requirement of the organism without substantial addition of mineral components. A suitable aqueous nutrient medium contains 10 g./l. glucose, 15 g./l. soy bean meal, 2.5 g./l. distiller's solubles, 2 g./l. dibasic potassium phosphate, 1 g./l. sodium chloride and 0.5 g./l. calcium carbonate. The pH of the fermentation is most suitably maintained between 6.5 and 7.5. After autoclaving and inoculating, the fermentation is carried out at a temperature usually between about 26° and about 32° C., with seration. In the laboratory, Fernbach flasks, mechanically shaken to provide seration and agitation, are suitable for propagation of the culture, while in the plant, standard fermentation vessels, familiar to those skilled in the art, equipped for submerged aerobic fermentation may be employed. Aseptic conditions should be maintained, of course, throughout the transfer of the inoculum and the growth of the organism.

The growth of the microorganism usually reaches its maximum after about 40–50 hours at about 30° C. while the anti-tumor agent production usually reaches its maximum after a total of about 60–80 hours at about 30° C. However, the optimum fermentation time will vary with temperature, variation in the equipment used, rate of aeration, stirring, etc. A period of at least 24 hours is required in any case. Ordinarily, there is no advantage to fermentation periods in excess of about 72 hours. The broths show some activity against yeasts. No suitable procedure procedure has been established for following the progress of the fermentation. The standard tissue culture test is the most reliable. This test, however, is time-consuming. Experience has shown that satisfactory yields of sangivamycin are obtained after carrying out the fermentations for about 60 to 80 hours.

After a satisfactory level of activity has been attained, sangivamycin may be isolated by procedures as hereinafter set forth. In the present invention, for example, a portion of the acivity may be recovered by extraction of the filtered broth with n-butanol at a pH of about 3. The extraction need not be limited to n-butanol, but other alcohols such as secondary butanol and tertiary amyl alcohol may also be used. The volume of solvent is not critical, but about a half volume of solvent is appropriate and provide good recovery. The resulting butanol extract

3,423,398 is concentrated azeotropically to remove most of the solvent. The resulting concentrate was found to possess high tumor-inhibiting activity.

Since the strain of *Streptomyces rimosus* of the instant invention also produces oxytetracycline, the following procedure may be followed to separate oxytetracycline from sangivamycin. The filtered broth is stirred with activated carbon at pH of about 3 to 8 and the carbon is filtered and eluted with anacidic lower alkanol such as acidic methanol, acidic ethanol, or with a methanol-water-pyridine (3:1:1) mixture. The eluate contains oxytetracycline and sangivamycin. The eluate is neutralized and concentrated to dryness. The residue obtained is dissolved in a lower alkanol such as methanol or in a mixture of water and a lower alkanol. The solution is thereafter contacted with a weakly basic anion exchange resin such as, for example, diethylaminoethyl cellulose or Amberlite IR-45 (a polystyrene base polyamine type ion exchange resin obtainable from Rohm & Haas Co.). In one example, oxytetracycline is absorbed on a column containing diethylaminoethyl cellulose while sangivamycin appears in the effluent. The effluent fractions are assayed by measurement of optical density at 280 mu. In the aforesaid method, elution may also be carried out with a mixture of methanol, pyridine, and water (3:1:1). The eluate is concentrated and the resulting concentrate is found to possess high tumor-inhibiting activity.

Still a further purification may be achieved by taking the neutral effluent of the chromatographic separation containing sangivamycin and concentrating to about $\frac{1}{10}$ volume. The bulk of the sangivamycin precipitates out. This solid material may be recrystallized from aqueous pyridine (1:4) or from 10% aqueous acetic acid. The mother liquors from this precipitate may be concentrated further and subjected to counter-current distribution in the system 1% acetic acid-n-butanol. The fractions thus obtained may be combined and concentrated to near dryness. The crystalline residue is filtered and washed with ice water.

Sangivamycin, a colorless, weakly basic substance has the molecular formula $C_{12}H_{15}O_5N_5$ and the structural formula

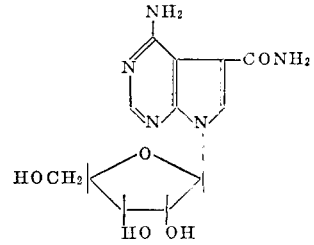

The chemical name is 4-amino-5-carboxamido-7-(D-ribofuranosyl)pyrrolo-(2,3-d)pyrimidine.

It forms salts with a variety of acids such as hydrochloric, sulfuric, citric, oxalic, acetic, butyric, nitric, hydrobromic, chloracetic and picri aids. Potentiometric titration of the hydrochloride salt shows it to be a monoacidic base with a $pK_a$ value of 3.4 and an equivalent weight of 310. It is obtained as monohydrate having the molecular formula $C_{12}H_{17}O_6N_5$.

It is isolated as the monohydrate in the form of colorless, long rectangular prisms melting at 258° to 260° C. Elemental analysis reveals approximately 43.9% carbon, 5.4% hydrogen and 21.2% nitrogen. The balance is accounted for by oxygen. The composition required for the monohydrate is 44.0% carbon, 5.2% hydrogen and 21.4% nitrogen. The water of hydration is very strongly bound but can be removed by prolonged drying in vacuo at elevated temperatures; e.g., 0.05 mm. at 150° C.

TABLE 1.—CULTURAL CHARACTERISTICS OF STREPTOMYCES RIMOSUS: BA-90912

| Medium | Growth | Aerial Mycelium and Spores | Soluble Pigment | Remarks |
|---|---|---|---|---|
| Glucose-Asparagine Agar | Good | Whitish-cream colored where present | Lacking | Some or all of colony may be naked, Nocardia-like, light yellow; reverse cream-colored. |
| Synthetic Agar | Moderate | White and becoming grayish | do | Reverse white. |
| Nutrient Agar | do | Lacking or white in spots | do | Vegetative mycelium dull, grayish; reverse whitish-gray. |
| Glucose Agar | do | Dull whitish-gray | do | Reverse white. |
| Skimmed Milk | Good in yellowish ring | | Soluble pigment buff (near Ridgway's Warm Buff) | Coagulation, some peptonization; pH changed from 6.6 to 6.8. |
| Potato Plug | Good | Whitish gray | Light yellow | Vegetative mycelium whitish, much convoluted. |
| Cellulose | Lacking | | | |
| Gelatin Plates | Moderate | Almost entirely lacking | Lacking | Liquefaction moderate. |
| Starch Plates | Poor, flat, thin | Lacking | do | Hydrolysis very slight. |
| Organic Nitrate Broth | | | | Nitrates detected. |
| Inorganic Nitrate Broth | | | | Do. |
| Peptone Iron Agar | | | | No $H_2S$ produced. |
| Calcium Malate Plates | Very poor, thin, flat | Lacking | Lacking | No digestion of malate. |
| Emerson's Agar | Moderate | Whitish | do | Reverse whitish. |
| Hickey and Tresner's Agar | Good flat | Light gray | do | Reverse cream to pink-colored. |
| Gauze's Medium No. 1 | Moderate | Lacking; vegetative mycelium near Ridgway's Pale Olive Buff | do | Do. |
| Jridham's Medium | Good; flat with deep furrows | Dull white; parts of colony Nocardia-like, light yellow | do | Reverse yellow. |

The product of the present invention shows a characteristic ultraviolet spectrum as shown in Table 2 below:

TABLE 2.—ULTRAVIOLET SPECTRAL BEHAVIOR OF SANGIVAMYCIN

| Medium | Max. | 1% E₁ cm. |
|---|---|---|
| Acid | 227 mu | 517 |
|  | 272 mu | 390 |
| Neutral | 228 mu | 300 |
|  | 278 mu | 460 |
| Basic | 245 mu | 258 |
|  | 278 mu | 470 |

A 1% solution of the product in dimethylacetamide exhibits an optical rotation of −96.7°. Sangivamycin exhibits characteristic absorption maxima at the following wave lengths in the infrared region of the spectrum when crystallized from aqueous acetic acid as the acetate and measured on a potassium bromide pellet containing 1% of the product: 3300, 3140, 2910, 2340, 2300, 2160, 1945, 1685, 1600, 1560, 1530, 1460, 1440, 1415, 1385, 1335, 1310, 1275, 1255, 1215, 1155, 1135, 1120, 1095, 1060, 1028, 1000, 978, 934, 905, 882, 866, 852, 821, 790, 756, 712, 676, 670, and 642 cm.$^{-1}$; when crystallized from aqueous pyridine as the free base: 3400, 3250, 2910, 2290, 1615, 1565, 1525, 1480, 1445, 1380, 1360, 1325, 1305, 1285, 1268, 1230, 1205, 1187, 1166, 1105, 1040, 1000, 970, 946, 890, 865, 851, 795, 764, 715, and 673 cm.$^{-1}$; when crystallized from aqueous hydrochloric acid as the hydrochloride: 3260, 2900, 2325, 2280, 1660, 1585, 1540, 1510, 1450, 1405, 1328, 1287, 1268, 1212, 1139, 1104, 1046, 1010, 970, 892, 875, 856, 846, 776, 757, 707, 672, and 642 cm.$^{-1}$. The curves are more particularly illustrated in the accompanying drawings, wherein the figures represent the characteristic adsorption spectra of BA–90912 as follows: FIGURE 1, crystallized from aqueous acetic acid, FIGURE 2, crystallized from aqueous pyridine, and FIGURE 3, crystallized from aqueous hydrochloric acid.

Sangivamycin exhibits slight solubility in water and the lower alcohols, moderate solubility in pyridine, dimethylformamide and in acid water, and almost complete insolubility in acetone, ethyl acetate, chloroform and ether. Furthermore, the active product readily forms salts, such as for example, the hydrochloride, the picrate and the reineckate. The resulting salts exhibit high tumor-inhibiting activity. The picrate, for example, crystallizes as yellow rectangular plates melting at 226° C. to 228° C. Elemental analysis for the picrate reveals approximately 40.4% carbon, 3.5% hydrogen and 20.8% nitrogen. The balance is accounted for by oxygen. The formula for the picrate, based on the empirical formula of the crystalline product of said invention, is $C_{12}H_{15}O_5N_5 \cdot C_6H_3O_7N_3$. The composition required for the calculated formula of the picrate is 40.2% carbon, 3.4% hydrogen, and 20.8 nitrogen. On the basis of the analysis of the picrate and by the colorimetric analysis of the picrate, an equivalent weight of 300±10 is obtained. The equivalent weight of the empirical formula, $C_{12}H_{15}O_5N_5$, is 309.

Sangivamycin forms a crystalline reineckate which crystallizes from aqueous acetone as rose-colored needles. These needles decompose at about 170° C. The reineckate may be readily prepared by the addition of a saturated aqueous solution of ammonium reineckate to a solution of sangivamycin in dilute hydrochloric acid. The reineckate is precipitated, filtered and recrystallized from aqueous acetone.

The nuclear magnetic resonance spectrum of sangivamycin run in trifluoroacetic acid contains the following characteristics: two sharp singlets at $\tau=1.67$ to 2.33 equal to 2 to 4 protons, a doublet at $\tau=3.59$ and 3.68 equal to one proton and the rest, several broad peaks in the region $\tau=4.87$–5.75. The spectrum shows some resemblance to the spectra of purine nucleosides. In harmony with this observed similarity, sangivamycin forms a tetraacetyl derivative, the nuclear magnetic resonance spectrum of which clearly indicates that one of the acetyl groups is on a nitrogen atom ($\tau=7.57$, 3 protons) and the other three are O-acetyl groups ($\tau=7.93$, 9 protons).

Additional support for the presence of a sugar is provided by the fact that sangivamycin reacts with one mole of periodate. No formaldehyde or formic acid are formed and the main product retains the original carbon skeleton. In spite of the above evidence which suggests the nucleosidic nature of the compound, direct acid hydrolysis of sangivamycin failed to yield a sugar component even under relatively drastic conditions. However, the periodata-reaction product undergoes smooth hydrolysis to yield a crystalline aglycone of composition $C_7H_6O_2N_4$, thus definitely establishing the presence of a pentose in sangivamycin.

The presence of an amino group in sangivamycin is inferred from the infrared spectrum, the acetylation experiment described herein and from the fact that sangivamycin is readily deaminated when heated with sodium nitrite in acetic acid. The oxydesamino compound obtained is no longer basic. Its ultraviolet absorption spectrum has a maximum at 268 mu which is unchanged in acid solution. These properties indicate that the amino group is of aromatic type and that it is a part of the chromophore.

Sangivamycin is rather stable to acid. It resists boiling in 3 N hydrochloric acid for one hour but on prolonged heating, forms ammonium chloride and a crystalline solid having the composition: $C_{12}H_{14}O_6N_4$. The same compound is also obtained by alkaline hydrolysis. It is named desamidosangivamycin. Its ultraviolet spectral properties are very similar to those of sangivamycin. Titration of its hydrochloride shows two regions of equilibrium (pk 2.9 and 5.6). This, as well as the infrared spectrum (peak at 5.80μ) are in harmony with the view that desamidosangivamycin has a carboxyl group. It can be esterified; e.g., to a monomethyl ester, $C_{13}H_{16}O_6N_4$ which shows a strong peak at 5.85μ in its infrared spectrum. It also has a strong three proton peak at $\tau=6.00$. Other esters such as the lower alkyl esters (ethyl, propyl, butyl), benzyl, phenethyl, etc. are also produced from desamidosangivamycin. The hydrazide, N-(lower alkyl)substituted amide and hydroxamic acid derivatives are produced from desamidosangivamycin, sangivamycin or from the esters by known methods. Oxidation with hydrogen peroxide produces the corresponding N-oxide. Dehydration of sangivamycin and of its tetraacetyl derivative by means of phosphorous oxychloride produces toyocamycin and tetraacetyl toyocamycin, respectively. The above described derivatives are active as antitumor agents, especially against lymphoid leukemia 1210, and serve as useful dosage forms.

From the foregoing it is evident that sangivamycin, $C_{12}H_{15}O_5N_5$, has a pentose residue, an aromatic amino group and a carboxamido group. It has two protons ($\tau=1.42$ and 1.53) as part of the heterocyclic system. A comparison of the ultraviolet absorption spectra of sangivamycin and toyocamycin shows they are very similar, including the spectral shift in acid medium. Their respective elementary compositions suggest that sangivamycin and toyocamycin have the same carbon skeleton with the former having a carboxamido while the latter has a nitrile group.

That the above hypothesis is, indeed, true can be shown in several ways. First, alkaline hydrolysis of toyocamycin yields an acid which is identical with desamidosangivamycin. Next, the tetraacetyl derivative of sangivamycin (V) can be dehydrated by means of phosphorus oxychloride to the tetraacetyl derivative of toyocamycin. The acetates when compared in the form of their crystalline picrate salts both show the characteristic sharp peak at 2230 cm.$^{-1}$ due to the nitrile group. Finally, by selective acid hydrolysis of toyocamycin in 2 N hydrochloric acid at 100°, sangivamycin can be isolated from the products as its hydrochloride.

Sangivamycin exhibits little or no activity against grampositive bacteria but is remarkably effective in treating a number of different types of malignancies. For this purpose, either the pure crystalline material may be administered, one of its salts, or one of its crude forms may be employed. These include filtered fermentation broths, as produced, for example, by the culture ATCC No. 14673, or solid or liquid concentrates prepared therefrom. Such preparations should be of sufficient potency to provide a daily dose equivalent to at least about 50 to 500 mcg. of the pure agent per kilogram of body weight. For this purpose, preparations having an anti-tumor agent concentration of at least about 0.0001%, and preferably 0.0005% or higher, should be provided. For the administration to man and animals, a relatively non-toxic carrier is, of course, selected. Toxicity for this purpose is defined as an adverse effect on the treated host at the level of ordinary use. Either liquid or solid pharmaceutical carriers may be employed, including water, aqueous ethanol, isotonic saline or glucose, starch, lactose, calcium phosphate, animal feed stuffs, or mixtures of various materials as occur in a filtered fermentation broth. Either oral or parenteral administration is satisfactory, although the parenteral route is perhaps preferable until a satisfactory regimen adapted to the patient is established. For this purpose, solutions or suspensions in water, oils, such as peanut oil or sesame oil, or other pharmaceutically acceptable solvents or vehicles may be employed. Solid preparations for extemporaneous dilution can be prepared containing various buffering agents, local anaesthetics and other medicinal agents including antibiotics, hypnotics, analgesics, as well as inorganic salts to afford desirable pharmaceutical properties to the composition.

In the therapy of tumors, the active substances of this invention may be employed in combination with one or more other carcinostatic agents. For this purpose, compositions containing from 10 to 90% by weight of the substance of the present invention are useful. Known carcinostatic agents which may be employed in such combinations include the nitrogen-mustard type, 6-mercaptopurine, 8 - azaguanine, urethane, 6 - diazo-5 - oxo-1-norleucine, azaserine, triethylenemelamine, mitomycin C, triethylenephosphoramide, 1,4 - dimethylsulfonyloxybutane, the carcinostatic folic acid analogs and the like.

Sangivamycin exhibits pronounced activity against human carcinoma cells (strain HeLa) grown in cell culture according to the procedure described by Rightsel et al. (Journal of Immunology, 76, 464–74) (1956). In this test the activity of the pure crystalline substance is detected at levels as low as 0.01 to 0.05 mcg./cc. At these concentrations there is extensive destruction of the tumor cells in vitro.

Sangivamycin was tested for anti-tumor activity against Crocker Sarcoma 180 in mice, hereinafter referred to as S-180, according to the procedure described by Reilly et al., Cancer Research, 13, No. 9, 684–7 (September 1953) and against established adenocarcinoma, hereinafter referred to as Established Ca-755, according to the procedure described by Gellhorn et al., Cancer Research, Supplement III, page 38 (1955). In both tests, the substance of the present invention exhibited pronounced activity as an anti-tumor agent.

The following examples are given by way of illustration and are not to be construed as limitations of this invention, the scope of which is indicated by the appended claims.

*Example I*

A fermentation broth of the following composition is prepared, adjusted to pH 7.0, and sterilized:

| | g./l. |
|---|---|
| Glucose | 10 |
| Soy bean meal | 15 |
| Distiller's solubles | 2.5 |
| Dibasic potassium phosphate | 2 |
| Sodium chloride | 1 |
| Calcium carbonate | 0.5 |
| Tap water to volume. | |

Inoculum is prepared by transferring a slant of *S. rimosus*, ATCC No. 14673, to a portion of this medium and incubating for about 48 hours at 28° C. on a rotary shaker. The main batch of medium is then inoculated with 2% by volume of the inoculum so prepared. The inoculated medium is incubated at 26°–30° C. with agitation and aeration at the rate of about one volume of air per volume of broth per minute. After 72 hours the fermentation is halted.

Broth prepared in this fashion and filtered is characterized by high activity against HeLa cells in tissue culture according to the method described by Rightsel (loc. cit.). Similar results are obtained by the filtered broth against experimental mouse leukemia (L 1210), see Table 3, when assayed according to CCNSC protocol in accordance with the procedure of Leiter et al., Cancer Research, Supplement 13, page 734 (1960).

*Table 3*

| | |
|---|---|
| Filtrate dilution | 1–6 |
| No. of survivors | 6/6 |
| Weight change (g.) | −1.9 |
| Result (prolongation of survival time), percent | 139 |

*Example II*

The filtered broth of Example I is stirred with activated charcoal at a pH of 4. The carbon is filtered, washed with water and eluted with 0.05N hydrochloric acid in methanol. The eluate is neutralized and concentrated to dryness. The residue is dissolved in methanol and passed through a column of diethylaminoethyl cellulose. Any oxytetracycline present in the filtered broth is completely adsorbed on the column. The effluent contains active material, sangivamycin.

*Example III*

The effluent of Example II is stirred with 1% Darco G-60 at a pH of 4.0. The carbon is filtered, washed with water and eluted with methanolic acid. The eluate is neutralized to pH of about 6 and concentration to about 1/10 volume precipitates sangivamycin monohydrate as a grayish white micro-crystalline solid. This solid is recrystallized from aqueous pyridine (1:4) as colorless, long rectangular prisms melting at about 258–260° C. and exhibits the same ultraviolet and infrared spectra as hereinbefore disclosed. Dehydration is accomplished by heating the monohydrate to 150° C. at 0.05 mm. mercury for 24 hours. Tables 4 and 5 indicate the biological activity of said material (monohydrate).

TABLE 4.—ANTI-TUMOR ACTIVITY OF SANGIVAMYCIN

| Dose, mg./kg. | No. of Survivors | Percent Inhibition | Tumor |
|---|---|---|---|
| 2.0 | 3/6 | 65 | S-180. |
| 1.5 | 5/6 | 60 | S-180. |
| 1.0 | 6/6 | 44 | S-180. |
| 3.0 | 4/6 | 67 | Est. Ca-755. |
| 2.5 | 5/6 | 53 | Est. Ca-755. |
| 2.0 | 5/6 | 54 | Ext. Ca-755. |

TABLE 5.—ANTI-LEUKEMIC ACTIVITY OF SANGIVAMYCIN

| Dose, mg./kg. | No. of Survivors | Percent Control | Remarks |
|---|---|---|---|
| 1.5 | 6/6 | 128 | Treated from the first day. |
| 1.0 | 6/6 | 132 | Do. |
| 0.75 | 6/6 | 140 | Do. |
| 0.50 | 6/6 | 146 | Do. |
| 0.375 | 6/6 | 128 | Do. |
| 1.5 | 6/6 | 151 | Treated every other day. |
| 1.0 | 6/6 | 152 | Do. |
| 0.5 | 6/6 | 136 | Do. |
| 4.0 | 6/6 | 178 | Treated every third day. |
| 3.5 | 6/6 | 145 | Do. |
| 3.0 | 6/6 | 155 | Do. |
| 2.5 | 6/6 | 134 | Do. |
| 5.0 | 6/6 | 168 | Treated on first day only. |

Example IV

A fermentation broth is prepared as follows:

|  | g./l. |
|---|---|
| Dextrose | 10.0 |
| Peptone | 2.5 |
| Beef extract | 2.5 |
| Yeast extract | 10.0 |
| Monobasic potassium phosphate | 2.0 |
| Sodium chloride | 2.0 |
| Sea salts | 0.2 |

Distilled water to volume.
Adjust to pH 7.0 before sterilization.

Inoculum is prepared by transferring a slant of *S. rimosus*, ATCC No. 14673, to a portion of this medium and incubating for about 48 hours at 28° C. on a rotary shaker. The main batch of medium is then inoculated with 2% by volume of the inoculum so prepared. The inoculated medium is incubated with agitation and aeration at the rate of about one volume of air per volume of broth per minute.

Fermentation is complete after 60 hours incubation at 28° C. The broth is filtered, and is found to exhibit significant activity against experimental mouse leukemia (L 1210), see Table 6, when assayed according to CCNSC protocol in accordance with the procedure of Leiter (loc. cit.).

TABLE 6

| Filtrate Dilution | No. of Survivors | Weight Change (g.) | Result (Prolongation of Survival Time) percent |
|---|---|---|---|
| 1-3 | 3/6 | −4.5 | (1) |
| 1-4 | 6/6 | −1.1 | 140 |
| 1-6 | 6/6 | −1.2 | 143 |
| 1-9 | 6/6 | −1.0 | 131 |

[1] Toxic.

Example V.—Sangivamycin picrate

The crystalline product of Example III (0.4 g.) is dissolved in 1N hydrochloric acid (10 cc.). Water is added to this solution to make a very dilute solution. An acetone solution of picric acid is added to the aqueous hydrochloric acid solution and the mixture heated to about 50° C. The solution is allowed to cool and the yellow crystals of the picrate are removed by filtration. The picrate melts at about 226° to 228 C. and exhibits high tumor-inhibiting activity. It exhibits the characteristics of the picrate as hereinbefore described.

Example VI.—Sangivamycin monohydrate

The filtrate obtained after precipitating the solid of Example III is subjected to counter-current distribution in the system 1% acetic acid-n-butanol. The sample is taken in 10 tubes and about 150 transfers are carried out. The bulk of the material moves to tubes 25 to 50. These fractions are combined and concentrated to near dryness. The crystalline residue is filtered out and washed with ice water. Sangivamycin monohydrate solid is recrystallized from aqueous pyridine as colorless, long rectangular prisms melting at about 258° to 260° C. and exhibits the same ultraviolet and infrared spectra as hereinbefore disclosed for the free monohydrate base.

Example VII.—Sangivamcyin reineckate

To a solution of sangivamycin (0.2 g.) in 0.1 N hydrochloric acid (5 cc.) is added a saturated aqueous solution of ammonium reineckate. After 15 minutes, the precipitate which forms is filtered and recrystallized from aqueous acetone. The rose-colored needles melt with decomposition at about 170° C. and exhibit high tumor-inhibiting activity.

Example VIII.—Sangivamycin acid salts

One gram of sangivamycin is added to about 20 cc. of water. To this mixture are added 2 to 3 cc. of 1 N hydrochloric acid. The solution is allowed to stand for several mintues, after which the hydrochloride which precipitates is filtered. The hydrochloride is recrystallized from acid water and is obtained as a crystalline solid which exhibits high tumor-inhibiting activity. It exhibits the characteristic infrared absorption spectrum as hereinbefore disclosed for the hydrochloride.

In like manner but using the appropirate acid in place of hydrochloric acid, the hydrobromide, nitrate, sulfate, phosphate, citrate, oxalate, acetate, propionate and butyrate salts are produced.

Example IX.—Sangivamycin hydrochloride

The filtered broth of Example I is stirred with activated charcoal, the charcoal filtered, washed with water followed by several eluations with 0.05 N methanolic hydrochloric acid. The combined eluates are concentrated without neutralization and set aside in the refrigerator. The crude crystalline solid of sangivamycin-hydrochloride which separates out is filtered and recrystallized from hot water. It separates as colorless long needles; M.P. 250–52° C.

*Analysis.*—Calc. for $C_{12}H_{15}O_5N_5,HCl,H_2O$: C, 39.75; H, 5.00; N, 19.30; Cl, 9.78%. Found: C, 40.14; H, 5.30; N, 19.26; Cl, 9.94%.

Example X.—Tetraacetylsangivamycin

A mixture of sangivamycin (1 g.), acetic anhydride (10 ml.) and pyridine (2 ml.) is heated at 100° C. for two hours. The cooled solution is diluted with water and extracted with chloroform after 30 mintues. The solvent extract is washed with aqueous sodium bicarbonate and concentrated to dryness. The acetate crystallizes from ethanol as colorless prisms; M.P. 153–55° C.

*Analysis.*—Calc. for $C_{20}H_{23}O_9N_5,1/2H_2O$: C, 49.39; H, 4.93; N, 14.41; acetyl, 35.40%. Found: C, 49.06; H, 5.21; N, 14.39; acetyl, 34.58%.

Example XI.—Oxydesaminosangivamycin

A solution of sangivamycin (0.5 g.) in glacial acetic acid (50 ml.) is cooled to 5° C. and treated with sodium nitrite (1 g. in 10 ml.). After 30 minutes at 5° C. the blue solution is heated at 80° C. for 30 minutes and then concentrated to dryness. The residue is crystallized from aqueous methanol. Oxydesaminosangivamycin crystallizes as colorless needles; M.P. 290–92° C.

*Analysis.*—Calc. for $C_{12}H_{14}O_6N_4$: C, 46.45; H, 4.55; N, 18.06%. Found: C, 46.25; H, 4.68; N, 18.07%.

Example XII.—Desamidosangivamycin

Sangivamycin (2 g.) is boiled under reflux with 2 N sodium hydroxide (200 ml.) for three hours. The cooled solution is diluted with water and passed through a column of Amberlite IR–C50 (an acrylic type carboxylic acid ion exchange resin available from Rohm & Haas Co.) in H+ form. The effluent and wash are concentrated to dryness and the residue is crystallized as the hydrochloride from methanol. The hydrochloride crystallizes as colorless long rectangular plates; M.P. 236–38° C.

*Analysis.*—Calc. for $C_{12}H_{14}O_6N_4HCl$: C, 41.50; H, 4.34; N, 16.12; Cl, 10.15%. Found: C, 41.00; H, 4.52; N, 15.89; Cl, 10.18%.

Example XIII.—Methyl ester of desamidosangivamycin

Desamidosangivamycin (1 g.) is boiled under reflux with 10% sulfuric acid in methanol (100 ml.) for about 24 hours. The cooled mixture is diluted with water (100 ml.) and passed through a column of Dowex-1 (a strongly basic anion exchange resin, a copolymer of styrene crosslinked with a divinyl aromatic compound containing trimethylammonium groups, available from the Dow Chemical Co.) in acetate form. The effluent and wash are concentrated to dryness and the solid is crystallized from methanol. The ester separates as colorless prisms; M.P. 216–18° C.

*Analysis.*—Calc. for $C_{13}H_{16}O_6N_4$: C, 48.15; H, 4.97; N, 17.28; $OCH_3(1)$, 9.60%. Found: C, 48.10; H, 5.07; N, 17.11; $OCH_3$, 9.69%.

In like manner the ethyl, propyl, isopropyl, butyl, benzyl and phenethyl esters are prepared using the appropriate alcohol in place of methanol.

*Example XIV.—Periodate oxidation of sangivamycin and hydrolysis*

Sangivamycin (1 g.) is dissolved in 1 N hydrochloric acid (30 ml.) and treated with 0.2 M aqueous paraperiodic acid (30 ml.). After 30 minutes the mixture is diluted with water (100 ml.), warmed to obtained a clear solution then passed through a column of Dowex-1 in acetate form. The combined effluent and wash on concentration yields a colorless solid which is crystallized as the hydrochloride; M.P. 170° C. (dec.).

A portion of the oxidation product (0.5 g.) is boiled under reflux with 6N hydrochloric acid for six hours. The dark colored mixture is concentrated to dryness and the solid crystallized twice from methanol. The product appears as colorless needles; M.P. 285–90° C.

*Analysis.*—Calc. for $C_7H_6O_2N_5HCl$: C, 39.17; H, 3.28; N, 26.00%. Found: C, 38.80; H, 3.90; N, 25.54%.

*Example XV.—Conversion of tetraacetylsangivamycin to tetraacetyl toyocamycin*

A solution of tetraacetylsangivamycin (0.2 g.) in chloroform (25 ml.) is boiled under reflux with phosphorus oxychloride (0.3 ml.) for three hours. The mixture is concentrated to a small volume and diluted with water. After 30 minutes it is neutralized and extracted with chloroform. The extract is concentrated and the residue converted to a picrate. The picrate crystallizes from acetone-methanol as yellow long needles; M.P. 160–62° C. Its mixed melting point with the picrate of tetraacetyltoyocamycin (prepared from toyocamycin) is undepressed.

Toyocamycin (0.2 g.) is acetylated at 100° C. with acetic anhydride (5 ml.) and pyridine (1 ml.) for two hours. The cooled mixture is poured into water and extracted with chloroform. The extract is washed with aqueous sodium bicarbonate and concentrated dryness. The glassy solid is converted into a picrate. The picrate crystallizes as yellow long needles; M.P. 160–62° C.

Hydrolysis of tetracetyl toyocamycin by means of dilute alcoholic hydrogen chloride produces toyocamycin.

*Example XVI.—Desamidohydrazio sangivamycin*

(a) A mixture of the methyl ester of desamidosangivamycin (0.5 g.), methanol (5 ml.) and hydrazine (2 ml.) is warmed until a clear solution is obtained. After 24 hours at room temperature, ether (25 ml.) is added and the resulting solid filtered off and crystallized from aqueous methanol. The hydrazide melts at 238°–240° C.

*Analysis.*—Calc. for $C_{12}H_{16}O_5N_6$: C, 44.44; H, 4.97; N, 25.92%. Found: C, 44.29; H, 5.22; N, 25.56%.

(b) A mixture of sangivamycin (1. g.), n-butanol (25 ml.) and hydrazine (4 ml.) is boiled under reflux for 20 hours. The solution is cooled, diluted with ether (100 ml.) and the solid which precipitates filtered off. It is crystallized first from methanol and then from aqueous methanol. The product is identical to that produced above.

*Example XVII.—N-methyl sangivamycin (N-methyl substituted amide of sangivamycin)*

To a suspension of the methyl ester of desamidosangivamycin (0.5 g.) in methanol (5 ml.) is added 40% aqueous methylamine solution (10 ml.). The mixture is warmed to obtain a clear solution and let stand at room temperature for 24 hours. The solution is concentrated to dryness and the solid crystallized as its hydrochloride from methanol. The hydrochloride of N-methyl sangivamycin is a colorless crystalline solid; M.P. 244°–246° C.

*Analysis.*—Calc. for $C_{13}H_{17}O_5N_5 \cdot HCl$: C, 42.80; H, 5.48; N, 19.20; Cl, 9.70%. Found: C, 42.76; H, 5.24; N, 19.11; Cl, 9.29%.

Repetition of this procedure but substituting methylamine by other lower alkylamines such as ethyl-,n-propyl-, n-butyl-, isobutyl and n-hexylamine produces the corresponding n-lower alkyl substituted derivatives.

*Example XVIII.—Hydroxamic acid of desamidosangivamycin*

A mixture of sangivamycin (1 g.), hydroxylamine hydrochloride (1 g.), and pyridine (10 ml.) is boiled under reflux for six hours then cooled and concentrated to dryness. The residue is dissolved in water and passed through a column of Dowex-1 in acetate form (50 ml. of resin). After washing with water, elution is carried out with 2% acetic acid. The eluate is concentrated to dryness and the solid crystallized from methanol as the hydrochloride. The compound is a colorless crystalline solid; M.P. 216°–218° C. It gives a blue color with ferric chloride.

*Analysis.*—Calc. for $C_{12}H_{15}O_6N_5 \cdot HCl$: C, 40.00; H, 4.44; Cl, 9.78%. Found: C, 40.19; H, 4.54; Cl, 9.29%.

*Example XIX.—N-oxide of sangivamycin*

A solution of sangivamycin (1. g.) in glacial acetic acid (10 ml.) is treated with 30% aqueous hydrogen peroxide (5 ml.). After three days at room temperature, the solution is diluted with ether and the solid filtered. It is crystallized from aqueous methnal. The N-oxide is a colorless crystalline solid; M.P. 276°–278° C.

*Analysis.*—Calc. for $C_{12}H_{15}O_6N_5$: C, 44.31; H, 4.65; N, 21.53%. Found: C, 44.21; H, 5.10; N, 21.41%.

*Example XX*

The procedure of Example VIII is applied to the products of Examples XII, XIII, XVI–XIX to produce the corresponding acid addition salts.

EXAMPLE XXI.—ANTI-TUMOR (L 1210) ACTIVITY OF DERIVATIVES OF SANGIVAMYCIN

| Compound | Dose, mg./kg. | Percent Prolongation of Survival Time |
|---|---|---|
| Hydrazide | 2.4 | 146 |
|  | 1.6 | 123 |
|  | 1.0 | 110 |
|  | 2.4 | 132 |
|  | 1.8 | 147 |
|  | 1.2 | 154 |
|  | 2.5 | 134 |
|  | 2.0 | 162 |
|  | 1.5 | 149 |
|  | 1.0 | 141 |
| N-methyl derivative | 2.4 | 148 |
|  | 1.6 | 155 |
|  | 1.1 | 143 |
|  | 2.4 | 149 |
|  | 1.8 | 145 |
|  | 1.2 | 144 |
|  | 1.0 | 128 |
| Hydroxamic acid | 3.0 | 136 |
|  | 6.0 | 144 |
|  | 4.0 | 127 |
|  | 2.7 | 119 |
| N-oxide | 0.8 | 141 |
|  | 1.0 | 130 |
|  | 3.0 | 132 |
| Methyl ester of Desamidosangivamycin | 2.0 | 132 |
|  | 1.33 | 139 |
|  | 1.88 | 138 |

What is claimed is:

1. A compound selected from the group consisting of 4 - amino - 5 - carboxamido-7-(D-ribofuranosyl)pyrrolo-(2,3-d)pyrimidine also known as sangivamycin, the N-(lower alkyl)substituted amides thereof, the N-oxide of sangivamycin, desamidohydrazidosangivamycin, sangivamycin monohydrate, and the pharmaceutically acceptable acid addition salts thereof.

2. 4-amino-5-carboxamido-7-(D-ribofuranosyl)pyrrolo-(2,3-d)pyrimidine.

3. The monohydrate of the compound of claim 2.

4. The hydrochloride of the compound of claim 2.

5. The N-oxide of the compound of claim 2.

6. A fermentation concentrate containing the compound of claim 2 as its principal active ingredient.

7. The hydrazide of the desamido derivative of the compound of claim 2.

References Cited

UNITED STATES PATENTS

| 3,074,929 | 1/1963 | Hitchings et al. | 260—211.5 |
| 3,225,029 | 12/1965 | Yamaoka | 260—211.5 |
| 3,287,352 | 11/1966 | Wiley | 260—211.5 |

LEWIS GOTTS, *Primary Examiner.*

JOHNNIE R. BROWN, *Assistant Examiner.*

U.S. Cl. X.R.

195—80; 260—559, 999